United States Patent [19]

Gergen et al.

[11] 4,101,605
[45] Jul. 18, 1978

[54] THERMOPLASTICPOLYESTER/BLOCK COPOLYMER BLEND

[75] Inventors: William P. Gergen; Sol Davison, both of Houston, Tex.

[73] Assignee: Shell Oil Company, Houston, Tex.

[21] Appl. No.: 794,156

[22] Filed: May 5, 1977

Related U.S. Application Data

[63] Continuation-in-part of Ser. No. 693,463, Jun. 7, 1976, abandoned.

[51] Int. Cl.² .............................................. C08L 67/06
[52] U.S. Cl. ........................... 260/873; 260/33.6 UA; 260/876 B
[58] Field of Search ................ 260/873, 876 B, 859 R

[56] References Cited

U.S. PATENT DOCUMENTS

| 3,189,664 | 6/1965 | Nozani | 260/881 |
| 3,562,355 | 2/1971 | Holden | 260/859 |
| 4,007,311 | 2/1977 | Harlan | 428/246 |

Primary Examiner—Richard B. Turer
Attorney, Agent, or Firm—Dean F. Vance

[57] ABSTRACT

Polymeric blends having structural integrity at unobviously high temperature and an improved balance of properties are prepared by intimately mixing certain selectively hydrogenated block copolymers with certain thermoplastic saturated polyesters under conditions where at least partial continuous networks which interlock are formed.

18 Claims, No Drawings

THERMOPLASTICPOLYESTER/BLOCK COPOLYMER BLEND

This application is a continuation-in-part of applicants' copending application Ser. No. 693,463, filed June 7, 1976, now abandoned.

BACKGROUND OF THE INVENTION

Block copolymers have been developed rapidly within the recent past, the starting monomers usually being monoalkenyl arenes such as styrene or alpha-methylstyrene and conjugated dienes such as butadiene and isoprene. A typical block copolymer of this type is represented by the structure polystyrene-polybutadiene-polystyrene (SBS). When the monoalkenyl arene blocks comprise less than about 55% by weight of the block copolymer, the product is essentially elastomeric. Moreover, due to its peculiar set of physical properties, it can be referred to more properly as a thermoplastic elastomer. By this is meant a polymer which in the melt state is processable in ordinary thermoplastic processing equipment but in the solid state behaves like a chemically vulcanized rubber without chemical vulcanization having been affected. Polymers of this type are highly useful in that the vulcanization step is eliminated and, contrary to vulcanized scrap rubbers, the scrap from the processing of thermoplastic elastomers can be recycled for further use.

Those block polymers which comprise in part conjugated diene polymer blocks have at least one substantial shortcoming, namely, their susceptibility to oxidation or ozonolysis. Substantial improvement both in stability and compatibility with alpha-olefin polymers have been made by hydrogenation of such block polymers. The hydrogenation may be non-selective, selective or complete. Certain technical advantages have been found for selective hydrogenation wherein at least about 80% of the aliphatic double bonds are reduced and no more than about 25% of the aromatic double bonds are reduced by hydrogenation. Block copolymers having selectively hydrogenated conjugated diene blocks are disclosed in U.S. Pat. No. 3,595,942.

Correspondingly, a group of polymers commonly referred to as engineering thermoplastics possess a balance of properties comprising strength, stiffness, impact resistance, and long term dimensional stability that make them useful as structural materials. However, for a particular application, the engineering thermoplastic alone may not offer the combination of properties desired and, therefore, means to correct this deficiency are of interest.

One particularly appealing route to achieve a material with the desired combination of properties is through blending together two or more polymers which individually have the properties sought. This approach has been successful in limited cases such as in the improvement of impact resistance for plastic, e.g. polystyrene, polypropylene, poly(vinyl chloride), etc., using special blending procedures or additives for this purpose. However, in general, blending of polymers has not been a successful route to enable one to combine into a single material the desirable individual characteristics of two or more polymers. Instead, it is often found that such blending results in combining the worst features of each with the result being a material of such poor properties as not to be of any practical or commercial value. The reasons for this failure are rather well understood and stem in part from the fact that thermodynamics teaches that most combinations of polymer pairs are not miscible, although a number of notable exceptions are known. More importantly, most polymers adhere poorly to one another. As a result, interfaces between component domains (a result of their immiscibility) represent areas of severe weakness in blends and, therefore, provide natural flaws and cracks which result in facile mechanical failure. Because of this, most polymer pairs are said to be "incompatible". In some instances the term compatibility is used synonymously with miscibility, however, compatibility is used here in a more general way that describes the ability to combine two polymers together for beneficial results and may or may not connote miscibility.

The present invention covers a polymer blend that is stable even though the individual polymers are dissimilar in chemical structure and are expected to be highly incompatible. For example, the styrene blocks of the present block copolymer have a solubility parameter, in units of $(cal/cm^3)^{1/2}$ as calculated by Small's method (J. Applied Chemistry, Vol. 3, page 71, 1953) of 9.1 and, the poly(ethylene/butylene) block is 7.9. However, the solubility parameter for polyesters such as poly(ethylene terephthalate) is 10.7 while that for cellulose acetate is over 13. See Polymer Handbook, pages IV-341 to 368, Interscience Publishers, 1966. One would not expect to be able to prepare stable blends of two polymers having such different solubility parameters.

SUMMARY OF THE INVENTION

A novel composition has now been found that exhibits excellent dimensional stability and integrity. The composition broadly comprises the admixture obtained by intimately mixing about 4 to about 96 parts by weight of a block copolymer and about 96 to about 4 parts by weight of a thermoplastic polyester so as to form at least partial continuous interlocking networks wherein: (a) said block copolymer comprises at least two monoalkenyl arene polymer end blocks A and at least one substantially completely hydrogenated conjugated diene mid block B, said block copolymer having an 8 to 55 percent by weight monoalkenyl arene polymer block content, each polymer block A having an average molecular weight of between about 5,000 and about 125,000, and each polymer block B having an average molecular weight of between about 10,000 and about 300,000; and (b) said thermoplastic polyester has a generally crystalline structure and a melting point over about 120° C.

The block copolymer of the instant invention effectively acts as a mechanical or structural stabilizer which interlocks the polymer structure networks and prevents the consequent separation of the polymers during processing and their subsequent use. As defined more fully hereinafter, the resulting structure of the instant polyblend (short for ∓polymer blend") is that of two at least partial continuous interlocking networks. This interlocked structure results in a dimensionally stable polyblend that will not delaminate upon extrusion and subsequent use.

To produce stable blends it is necessary that both polymers have at least partial continuous networks which interlock with each other. In an ideal situation both polymers would have complete continuous networks which interlock with each other. A partial continuous network means that a portion of the polymer has a continuous network phase while the other portion has a disperse phase structure. Preferably, a major proportion (greater than 50% by weight) of the partial continuous network is continuous.

It is particularly surprising that stable blends are produced over very wide relative concentrations. For example, blends containing as little as 4 parts by weight of the block copolymer per 100 total in the blend or as high as 96 per 100 total are attainable. As explained more fully hereinafter, the instant block copolymers have this ability to produce stable blends over a wide range of concentrations since they are oxidatively stable, possess essentially an infinite viscosity at zero shear rate, and retain network or domain structure in the melt.

Most significantly, polymer blends of the instant invention have an unexpectedly superior balance of properties. Since each phase network is continuous in every phase, each network can donate independently to the blend properties and it is possible for additive relationships to exist in mechanical phenomena. For example, with regard to modulus related properties: at low volume fraction of the engineering resin, the elastic modulus, modulus temperature behavior, and hardness are characteristic of a foamed resin structure with a density equivalent to the situation where the rubber volume is replaced by air. Another indication of the dominance of the resin skeletal system at low strain is the observation that in the binary system there is normally less than 5 points, and frequently less than two points, difference in Shore A hardness between blends of resin to elastomer of 1:1 and 3:1.

Since each component in the present blends can independently donate to the blend properties within certain boundaries, it is now possible to tailor blends to remove specific defects. For example, DuPont's HYTREL® resin is a polyester-polyether segmented copolymer. However, there is a strong interaction between the polyester and polyether segments in HYTREL® which results in a significant reduction in the polyester melting temperature. On the other hand, blends of poly(butylene terephthalate) and the present block copolymer holds it integrity up to the melting point of the polyester and has better high temperature and related properties. Structural integrity means that without being stretched beyond its elastic limit, the polymer blend will retain its structure and be useful over a wide range of temperatures. One means to measure structural integrity is by a rheovibron analysis. A rheovibron analysis of the subject block copolymer alone shows a sharp drop in modulus at about 100° C corresponding to the glass transition temperature of the styrene end blocks. A similar analysis of the polyester alone slows a sharp drop in modulus at 225° C. One would typically expect a blend of the block copolymer and polyester to have a significant drop off in modulus at 100° C and then again at 225° C. However, a rheovibron analysis of the block copolymer/polyester blend of Illustrative Embodiment I showed that the modulus retained very high values up to about 225° C, thereby revealing an unexpectedly high structural integrity.

In addition, the blends of the present invention approach more nearly the theoretical upper limits of the Tayakangi model for co-continuous versus parallel structures. One would typically expect that the blend of a rubber and an engineering thermoplastic would approach more nearly the theoretical lower limit of the Tayakangi model.

DETAILED DESCRIPTION OF THE INVENTION

A. Block Copolymer

The block copolymers employed in the present invention may have a variety of geometrical structures, since the invention does not depend on any specific geometrical structure, but rather upon the chemical constitution of each of the polymer blocks. Thus, the structures may be linear, radial or branched so long as each copolymer has at least two polymer end blocks A and at least one polymer mid block B as defined above. Methods for the preparation of such polymers are known in the art. Particular reference will be made to the use of lithium based catalysts and especially lithium-alkyls for the preparation of the precursor polymers (polymers before hydrogenation). U.S. Pat. No. 3,595,942 not only describes some of the polymers of the instant invention but also describes suitable methods for their hydrogenation. The structure of the polymers is determined by their methods of polymerization. For example, linear polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the precursor polymers of three or more. Coupling may be effected with multifunctional coupling agents such as dihaloalkanes or -alkenes and divinyl benzene as well as certain polar compounds such as silicon halides, siloxanes or esters of monohydric alcohols with carboxylic acids. The presence of any coupling residues in the polymer may be ignored for an adequate description of the polymers forming a part of the compositions of this invention. Likewise, in the generic sense, the specific structures also may be ignored. The invention applies especially to the use of selectively hydrogenated polymers having the configuration before hydrogenation of the following typical species:

polystyrene-polybutadiene-polystyrene (SBS)
polystyrene-polyisoprene-polystyrene (SIS)
poly(alpha-methylstyrene)-polybutadiene-poly(alpha-methylstyrene) and
poly(alpha-methylstyrene)-polyisoprene-poly(alpha-methystyrene)

It will be understood that both blocks A and B may be either homopolymer or random copolymer blocks as long as each block predominates in at least one class of the monomers characterizing the blocks and as long as the A blocks individually predominate in monoalkenyl arenes and the B blocks individually predominate in dienes. The term "monoalkenyl arene" will be taken to include especially styrene and its analogs and homologs including alpha-methylstyrene and ring-substituted styrenes, particularly ring-methylated styrenes. The preferred monoalkenyl arenes are styrene and alpha-methylstyrene, and styrene is particularly preferred. The blocks B may comprise homopolymers of butadiene or isoprene and copolymers of one of these two dienes with a monoalkenyl arene as long as the blocks B predominate in conjugated diene units. When the monomer employed is butadiene, it is preferred that between about 35 and about 55 mol percent of the condensed butadiene units in the butadiene polymer block have 1,2 configuration. Thus, when such a block is hydrogenated, the resulting product is, or resembles, a regular copolymer block of ethylene and butene-1 (EB). If the conjugated diene employed is isoprene, the resulting hydrogenated product is or resembles a regular copolymer block of ethylene and propylene (EP).

Hydrogenation of the precursor block copolymers is preferably effected by use of a catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the alkenyl arene aromatic double bonds. Preferred block copolymers are those where at least 99% of the aliphatic double bonds are hydrogenated while less than 5% of the aromatic double bonds are hydrogenated.

The average molecular weights of the individual blocks may vary within certain limits. In most instances, the monoalkenyl arene blocks will have number average molecular weights in the order of 5,000–125,000, preferably 7,000–60,000 while the conjugated diene blocks either before or after hydrogenation will have average molecular weights in the order of 10,000–300,000, preferably 30,000–150,000. The total average molecular weight of the block copolymer is typically in the order of 25,000 to about 350,000, preferably from about 35,000 to about 300,000. These molecular weights are most accurately determined by tritium counting methods or osmotic pressure measurements.

The proportion of the monoalkenyl arene blocks should be between about 8 and 55% by weight of the block copolymer, preferably between about 10 and 30% by weight.

While the average molecular weight of the individual blocks is not critical, at least within the above specified limits, it is important to select the type and total molecular weight of the block copolymer in order to ensure the compatibility necessary to get the interlocking network under the chosen blending conditions. As discussed more fully hereinafter, best results are obtained when the viscosity of the block copolymer and the engineering thermoplastic resin are substantially the same at the temperature used for blending and processing. In some instances, matching of the viscosity of the block copolymer portion and the resin portion are best achieved by using two or more block copolymers or resins. For example, a blend of two block copolymers having different molecular weights or a blend of a hydrogenated SBS and hydrogenated SIS polymers may be employed.

Matching of the viscosity of the block copolymer portion and the engineering thermoplastic resin portion may also be accomplished by adding supplemental blending components such as hydrocarbon oils and other resins. These supplementary components may be blended with the block copolymer portion or the engineering thermoplastic resin portion, but it is preferred to add the additional components to the block copolymer portion. This pre-blended block copolymer composition is then intimately mixed with the engineering thermoplastic resin to form compositions according to the present invention.

The types of oils useful in the practice of this invention are those polymer extending oils ordinarily used in the processing of rubber and plastics, e.g. rubber compounding oils. Especially preferred are the types of oil that are compatible with the elastomeric segment of the block copolymer. While oils of higher aromatics content are satisfactory, those petroleum-based white oils having low volatility and less than 50% aromatics content as determined by the clay gel method of tentative ASTM method D 2007 are particularly preferred. The oils should additionally have low volatility, preferably having an initial boiling point above 500° F. The amount of oil employed varies from about 0 to about 100 phr (parts by weight per hundred parts by weight rubber, or block copolymer as in this case), preferably about 5 to about 30 phr.

The additional resins employed in matching viscosities are flow promoting resins such as alpha-methylstyrene resins, and end block plasticizing resins. Suitable end block plasticizing resins include coumarone-indene resins, vinyl toluene-alpha-methylstyrene copolymers, polyindene resins, and low molecular weight polystyrene resins. See U.S. Pat. No. 3,917,607. The amount of additional resin employed varies from about 0 to about 100 phr, preferably about 5 to about 25 phr.

B. Thermoplastic Polyesters

The thermoplastic polyesters employed in the instant invention have a generally crystalline structure, a melting point over about 120° C, and are thermoplastic as opposed to thermosetting.

One particularly useful group of polyesters are those thermoplastic polyesters prepared by condensing a dicarboxylic acid or the lower alkyl ester, acid halide, or anhydride derivatives thereof with a glycol, according to methods well-known in the art.

Among the aromatic and aliphatic dicarboxylic acids suitable for preparing polyesters useful in the present invention are oxalic acid, malonic acid, succinic acid, glutaric acid, adipic acid, suberic acid, azelaic acid, sebacic acid, terephthalic acid, isophthalic acid, p-carboxyphenoacetic acid, p,p'-dicarboxydiphenyl, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, p-carboxyphenoxyhexanoic acid, p,p'-dicarboxydiphenylmethane, p,p-dicarboxydiphenylpropane, p,p'-dicarboxydiphenyloctane, 3-alkyl-4-($\beta$-carboxyethoxy)-benzoic acid, 2,6-naphthalene dicarboxylic acid, 2,7-naphthalene dicarboxylic acid, and the like. Mixtures of dicarboxylic acids can also be employed. Terephthalic acid is particularly preferred.

The glycols suitable for preparing the polyesters useful in the present invention include straight chain alkylene glycols of 2 to 12 carbon atoms such as ethylene glycol, 1,3-propylene glycol, 1,6-hexylene glycol, 1,10-decamethylene glycol, 1,12-dodecamethylene glycol and the like. Aromatic glycols can be substituted in whole or in part. Suitable aromatic dihydroxy compounds include p-xylylene glycol, pyrocatechol, resorcinol, hydroquinone, or alkyl-substituted derivatives of these compounds. Another suitable glycol is 1,4-cyclohexane dimethanol. Much preferred glycols are the straight chain alkylene glycols having 2 to 4 carbon atoms.

A preferred group of polyesters are poly(ethylene terephthalate), poly(propylene terephthalate), and poly(butylene terephthalate). A much preferred polyester is poly(butylene terephthalate). Poly(butylene terephthalate), a crystalline copolymer, may be formed by the polycondensation of 1,4-butanediol and dimethylterephthalate or terephthalic acid, and has the generalized formula:

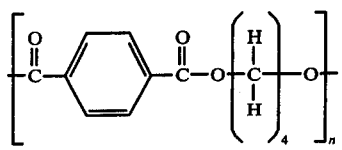

where n varies from 70 to 140. The molecular weight of the poly(butylene terephthalate) typically varies from about 20,000 to about 25,000. A suitable process for manufacturing the polymer is disclosed in British Pat. No. 1,305,130.

Commercially available poly(butylene terephthalate) is available from General Electric under the tradename VALOX ® thermoplastic polyester. Other commercial polymers include CELANEX ® from Celenese, TENITE ® from Eastman Kodak, and VITUF ® from Goodyear Chemical.

Another useful polyester is polypivalolactone. Polypivalolactone is a linear polymer having recurring ester structural units mainly of the formula:

i.e., units derived from pivalolactone. Preferably the polyester is a pivalolactone homopolymer. Also included, however, are the copolymers of pivalolactone with not more than 50 mole percent, preferably not more than 10 mole percent of other beta-propiolactones, such as beta-propiolactone, alpha, alpha-diethyl-beta-propiolactone and alpha-methyl-alpha-ethyl-beta-propiolactone. The term "beta-propiolactones" refers to beta-propiolactone(2-oxetanone) and to derivatives thereof which carry no substituents at the beta-carbon atom of the lactone ring. Preferred beta-propiolactones are those containing a tertiary or quaternary carbon atom in the alpha position relative to the carbonyl group. Especially preferred are the alpha, alpha-dialkyl-beta-propiolactones wherein each of the alkyl groups independently has from one to four carbon atoms. Examples of useful monomers are:

alpha-ethyl-alpha-methyl-beta-propiolactone,
alpha-methyl-alpha-isopropyl-beta-propiolactone,
alpha-ethyl-alpha-n-butyl-beta-propiolactone,
alpha-chloromethyl-alpha-methyl-beta-propiolactone,
alpha, alpha-bis(chloromethyl)-beta-propiolactone, and
alpha, alpha-dimethl-beta-propiolactone(pivalolactone).

See generally U.S. Pat. Nos. 3,259,607; 3,299,171; and 3,579,489. These polypivalolactones have a molecular weight in excess of 20,000 and a melting point in excess of 120° C.

Another useful polyester is polycaprolactone. Typical poly(ε-caprolactones) are substantially linear polymers in which the repeating unit is

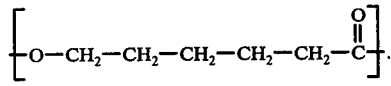

These polymers have similar properties to the polypivalolactones and may be prepared by a similar polymerization mechanism. See generally U.S. Pat. No. 3,259,607.

C. Viscosity Modifiers

In order to better match the viscosity characteristics of the thermoplastic engineering resin and the block copolymer, it is sometimes useful to first blend the thermoplastic engineering resin with a viscosity modifier before blending the resulting mixture with the block copolymer. Suitable viscosity modifiers should have a relatively high viscosity, a melt temperature of over about 230° C, and possess a viscosity that is not very sensitive to changes in temperature. Examples of suitable viscosity modifiers include poly(2,6-dimethyl-1,4-phenylene)oxide and blends of poly(2,6-diemthyl-1,4-phenylene)oxide with polystyrene.

The poly(phenylene oxides) included as possible viscosity modifiers may be presented by the following formula

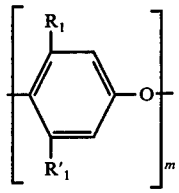

wherein $R_1$ is a monovalent substituent selected from the group consisting of hydrogen, hydrocarbon radicals free of a tertiary alpha-carbon atom, halohydrocarbon radicals having at least two carbon atoms between the halogen atom and phenol nucleus and being free of a tertiary alpha-carbon atom, hydrocarbonoxy radicals free of aliphatic, tertiary alpha-carbon atoms, and halohydrocarbonoxy radicals having at least two carbon atoms between the halogen atom and phenol nucleus and being free of an aliphatic, tertiary alpha-carbon atom; $R'_1$ is the same as $R_1$ and may additionally be a halogen; $m$ is an integer equal to at least 50, e.g. from 50 to 800 and preferably 150 to 300. Included among these preferred polymers are polymers having a molecular weight in the range of between 6,000 and 100,000 preferably about 40,000. Preferably, the poly(phenylene oxide) is poly(2,6-dimethyl-1,4-phenylene)oxide. These poly(phenylene oxides) are described, for example, in U.S. Pat. Nos. 3,306,874; 3,306,875; and 3,639,508.

Commercially, the poly(phenylene oxide) is available as a blend with styrene resin. See U.S. Pat. Nos. 3,383,435 and 3,663,654. These blends typically comprise between about 25 and 50% by weight polystyrene units, and are available from General Electric Company under the tradename NORYL ® thermoplastic resin. The preferred molecular weight when employing a poly(phenylene oxide)/polystyrene blend is between about 10,000 and about 50,000, preferably around 30,000.

The amount of viscosity modifier employed depends primarily upon the difference between the viscosities of the block copolymer and the engineering thermoplastic resin at the processing temperature Tp. Typical amounts range from about 0 to about 100 parts by weight viscosity modifier per 100 parts by weight engineering thermoplastic resin, preferably from about 10 to about 50 parts by weight per 100 parts engineering thermoplastic resin.

D. Method of Forming Interlocking Networks

It is an essential aspect of the present invention that the various polymers can be blended in such a way as to form co-continuous interlocking networks; i.e., where a continuous phase of one polymer would be thought of as filling the voids of a continuous phase of the second polymer. The interlocking structure of the various polymers does not show gross phase separation such as would lead to delamination. Further, the blend is not so intimately mixed that there is molecular mixing or miscibility, nor one in which the separate phases will lead to delamination.

Without wishing to be bound to any particular theory, it is considered that there are two general requirements for the formation of an interlocking network. First, there must be a primary phase network stable to the shearing field. This requirement is fulfilled by employing the block copolymers of the instant invention having the capability of self-crosslinking (network formation) and furthermore having sufficiently high molecular weight to retain its network (domain) structure in processing. Second, the other polymers employed must be capable of some kind of chemical or physical crosslinks or other intermolecular association to maintain a continuous phase in the blend. The polymer must possess sufficient fluidity to interlock with the primary network in the blending process. This second requirement is met by the instant thermoplastic engineering resins and the blends of these resins with the instant viscosity modifiers.

There are at least two methods (other than the absence of delamination) by which the presence of an interlocking network can be shown. In one method, an interlocking network is shown when molded or extruded objects made from the blends of this invention are placed in a refluxing solvent that quantitatively dissolves away the block copolymer and other soluble components, and the remaining polymer structure (comprising the thermoplastic engineering resin) still has the shape and continuity of the molded or extruded object and is intact structurally without any crumbling or delamination, and the refluxing solvent carries no insoluble particulate matter. If these criteria are fulfilled, then both the unextracted and extracted phases are interlocking and continuous. The unextracted phase must be continuous because it is geometrically and mechanically intact. The extracted phase must have been continuous before extraction, since quantitative extraction of a dispersed phase from an insoluble matrix is highly unlikely. Finally, interlocking networks must be present in order to have simultaneous continuous phases. Also, confirmation of the continuity of the unextracted phase may be confirmed by microscopic examination.

In the second method, a mechanical property such as tensile modulus is measured and compared with that expected from an assumed system where each continuous isotropically distributed phase contributes a fraction of the mechanical response, proportional to its compositional fraction by volume. Correspondence of the two values indicates presence of the interlocking network, whereas, if the interlocking network is not present, the measured value is different than that of the predicted value.

An important aspect of the present invention is that the relative proportions of the various polymers in the blend can be varied over a wide range. The relative proportions of the polymers are presented below in parts by weight (the total blend comprising 100 parts):

|  | Preferred | Most Preferred |
| --- | --- | --- |
| Engineering Thermoplastic | 96 to 4 | 93 to 7 |
| Block Copolymer | 4 to 96 | 7 to 93 |

Accordingly, it is possible to prepare a wide variety of polymer blends ranging from a flexibilized engineering thermoplastic to a stiffened elastomeric block copolymer. Note that the minimum amount of block copolymer necessary to achieve these blends may vary with the particular engineering thermoplastic.

The blending of the engineering thermoplastic resin and the block copolymer may be done in any manner that produces a blend which will not delaminate on processing, i.e., in any manner that produces the interlocking network. For example, the resin and block copolymer may be dissolved in a solvent common for all and coagulated by admixing in a solvent in which none of the polymers are soluble. But more preferably, a particularly useful procedure is to intimately mix the polymers in the form of granules and/or powder in a high shear mixer. "Intimately mixing" means to mix the polymers with sufficient mechanical shear and thermal energy to ensure that interlocking of the various networks is achieved. Intimate mixing is typically achieved by employing high shear extrusion compounding machines such as twin screw compounding extruders and thermoplastic extruders having at least a 20:1 L/D ratio and a compression ratio of 3 or 4:1.

The mixing or processing temperature (Tp) is selected in accordance with the particular polymers to be blended. For example, when melt blending the polymers instead of solution blending, it will be necessary to select a processing temperature above the melting point of the highest melting point polymer. In addition, as explained more fully hereinafter, the processing temperature may also be chosen so as to permit the isoviscous mixing of the polymers. Typically, the mixing or processing temperature is between about 150° C and about 400° C. For blends containing poly(butylene terephthalate) Tp is preferably between about 230° C and about 300° C.

Another parameter that is important in melt blending to ensure the formation of interlocking networks is matching the viscosities of the block copolymer and the engineering thermoplastic resin (isoviscous mixing) at the temperature and shear stress of the mixing process. The better the interdispersion of the engineering resin in the block copolymer network, the better the chance for formation of co-continuous interlocking networks on subsequent cooling. Therefore, it has been found that when the block copolymer has a viscosity $\eta$ poise at temperature Tp and shear rate of 100 sec$^{-1}$, it is much preferred that the viscosity of the engineering thermoplastic resin or blend containing such resin have a viscosity at temperature Tp and a shear rate of 100 sec$^{-1}$ such that the ratio of the viscosity of the block copolymer over the viscosity of the engineering thermoplastic be between about 0.2 and about 4.0, preferably between about 0.8 and about 1.2. Accordingly, as used herein, isoviscous mixing means that the viscosity of the block copolymer divided by the viscosity of the other polymer or polymer blend at the temperature Tp is between about 0.2 and about 4.0. It should also be noted that within an extruder, there is a wide distribution of shear rates. Therefore, isoviscous mixing can occur even though the viscosity curves of two polymers differ at some of the shear rates.

The block copolymer or block copolymer blend may be selected to essentially match the viscosity of the engineering resin. Optionally, the block copolymer may be mixed with a rubber compounding oil or supplemental resin as described hereinbefore to change the viscosity characteristics of the block copolymer.

The particular physical properties of the instant block copolymers are important in forming co-continuous interlocking networks. Specifically, the most preferred block copolymers of the instant invention when unblended do not melt in the ordinary sense with increasing temperature, since the viscosity of these polymers is highly non-Newtonian and tends to increase without limit as zero shear stress is approached. Further, the viscosity of these block copolymers is also relatively insensitive to temperature. This rheological behavior and inherent thermal stability of the block copolymer enhances its ability to retain its network (domain) structure in the melt so that when the various blends are made, interlocking and continuous networks are formed.

The viscosity behavior of the instant thermoplastic engineering resin, on the other hand, typically is more sensitive to temperature than that of the instant block copolymers. Accordingly, it is often possible to select a processing temperature Tp at which the viscosities of the block copolymer and engineering resin fall within the required range necessary to form interlocking networks. Optionally, a viscosity modifier, as hereinabove described, may first be blended with the engineering thermoplastic resin to achieve the necessary viscosity matching.

E. Uses and Additional Components

The polymer blends of the instant invention may be compounded further with other polymers, oils, fillers, reinforcements, antioxidants, stabilizers, fire retardants, antiblocking agents and other rubber and plastic compounding ingredients without departing from the scope of this invention.

Examples of various fillers that can be employed are in the 1971–1972 Modern Plastics Encyclopedia, pages 240–247. Reinforcements are also very useful in the present polymer blends. A reinforcement may be defined simply as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Especially preferred are reinforced polymer blends of the instant invention containing about 2 to about 80 percent by weight glass fibers, based on the total weight of the resulting reinforced blend. It is particularly desired that coupling agents, such as various silanes, be employed in the preparation of the reinforced blends.

The polymer blends of the instant invention can be employed in any use typically performed by engineering thermoplastics, such as metal replacements and those areas where high performance is necessary.

To illustrate the instant invention, the following illustrative embodiments are given. It is to be understood, however, that the embodiments are given for the purpose of illustration only and the invention is not to be regarded as limited to any of the specific materials or conditions used in the specific embodiments.

Illustrative Embodiment I

In Illustrative Embodiment I, poly(butylene terephthalate) ("PBT") was blended with a particular block copolymer to form co-continuous interlocking network phases. The block copolymer prior to hydrogenation was a styrene-butadiene-styrene block copolymer having a molecular weight distribution of 25,000-100,000-25,000 and a 1,2 content for the butadiene blocks of about 42%. The block copolymer was selectively hydrogenated such that greater than 95% of the aliphatic double bonds were reduced while less than 5% of the aromatic bonds were reduced. This polymer is designated Block Copolymer I (SEBS).

Two different recipes were examined:

|                    | (A) | (B) |
|--------------------|-----|-----|
| Block Copolymer I  | 100 | 100 |
| Engineering Resin  | 100 | 70  |
| Oil I              | 100 | —   |
| Oil II             | —   | 50  |

All units are parts by weight. Oil I is Shellflex 790, a paraffinic rubber extending oil. Oil II is Tufflo 6056, a hydrogenated bright stock oil. Also present is 10 parts polypropylene, 0.2 parts Irganox 1010 (an antioxidant), 0.5 parts dilaurothiodipropionate, LTDP (an antioxidant), and 5 parts TiO$_2$. The PBT was General Electric's Valox ® 310 resin. The various blends were mixed by passing the components through two passes of a Brabender extruder at 260° C. The viscosity of the components at 260° C were:

| Block Copolymer plus oil and polypropylene | 3,200 poise |
|--------------------------------------------|-------------|
| PBT                                        | 3,000 poise |

The results are presented below:

| Blend No.                      | 1   | 2    |
|--------------------------------|-----|------|
| Recipe No.                     | A   | B    |
| Test Results                   |     |      |
| Hardness (Shore A)             | 85  | 85   |
| Tensile at break (psi) Normal  | 900 | 1050 |
| Parallel                       | 700 | 1150 |
| Elongation at break (%) Normal | 220 | 350  |
| Parallel                       | 140 | 160  |
| 100% Modulus (psi) Normal      | 660 | 800  |
| Parallel                       | 880 | 1100 |

Illustrative Embodiment II

Illustrative Embodiment II discloses blends of two different block copolymers with the PBT to form co-continuous interlocking network phases. Block Copolymer II prior to hydrogenation, was an SBS block copolymer having a molecular weight distribution of about 29,000-116,000-29,000 and a 1,2 content for the butadiene portion of about 42%. Block Copolymer III prior to hydrogenation, was an SBS block copolymer having a molecular weight distribution of about 10,000-55,000-10,000 and a 1,2 content for the butadiene portion of about 42%. Both block copolymers were selectively hydrogenated such that greater than about 95% of the aliphatic double bonds were reduced while less than 5% of the aromatic bonds were reduced. The polypropylene employed was Shell PP 5520. The blend composition is presented below in parts by weight:

| Blend No. 3 | |
|---|---|
| Block Copolymer II | 60 |
| Block Copolymer III | 40 |
| Oil II | 30 |
| Polypropylene | 15 |
| PBT | 60 |
| Irganox 1010 | 3.0 |
| Plastinox LTDP | 0.5 |
| Irganox 1024 | 0.2 |
| Total | 208.7 |

The blend was prepared by first mixing the block copolymers, oil, polypropylene and additives on a rubber compounding mixer. Then the resulting block copolymer composition was intimately mixed with the engineering thermoplastic resin by passing the components through a WP twin-screw extruding machine at temperature settings between about 240° to 300° C so as to maintain a melt temperature of about 285° to 290° C. The test results are presented below:

| Physical Properties | |
|---|---|
| Specific Gravity | 0.97 |
| Shore A Hardness | 87 |
| Flexural Stiffness[1] - psi | 850 |
| 100% Modulus - psi | 900 |
| 300% Modulus - psi | 1325 |
| 500% Modulus - psi | 1950 |
| Tensile at Break - psi | 2300 |
| Elongation at Break - % | 550 |
| Tear Strength[2] - pli | 315 |
| Limiting Oxygen Index | 17.7 |

[1]Wire coating from 15 ga 30 mil wall stiffness and tensile properties.
[2]Injection molded slabs, flow direction.

Illustrative Embodiment III

In Illustrative Embodiment III various blends of PBT with selectively hydrogenated block copolymers of the present invention were prepared by mixing the polymers in a 1¼ inch Sterling Extruder having a Kenics nozzle. The extruder had a 24:1 L/D ratio and a 3.8:1 compression ratio screw. These block copolymers all had the structure S-EB-S and had block molecular weights as follows:

| Block Copolymer II | 29,000-116,000-29,000 |
|---|---|
| Block Copolymer III | 10,000-55,000-10,000 |
| Block Copolymer IV | 7,500-38,000-7,500 |

Where oil was employed, the block copolymer and oil were premixed prior to the addition of the PBT.

The compositions, conditions and test results are presented below in Table 1. In each case, the resulting polyblend had the desired interlocking network phases as established by the criteria hereinabove described.

The small strain properties were obtained by use of an Instron Tensile Tester with a loading rate of 0.2 inches per minute and a strain at 23° C of 0.0333 sec$^{-1}$.

TABLE 1

| Blend No. | 133 | 137 | 138 | 139 | 144 | 185 | 186 |
|---|---|---|---|---|---|---|---|
| Compositions, parts by weight | | | | | | | |
| Block Copolymer II | | | | | 17.5 | 52.5 | 35.0 |
| Block Copolymer III | | | | | 7.5 | 22.5 | 15.0 |
| Block Copolymer IV | 13.5 | 22.7 | 64.3 | 72.8 | | | |
| Oil | 1.5 | 2.3 | 6.3 | 7.2 | | | |
| PBT | 85.0 | 75.0 | 29.4 | 20.0 | 75.0 | 25.0 | 50.0 |
| Mixing Temperature (° C) | | | | | 294 | 304 | 280 |
| Properties | | | | | | | |
| Tensile at Break, psi, | | | | | | | |
| Normal | | | | | 3830 | 3340 | 3030 |
| Parallel | | | | | 3780 | 2040 | 2980 |
| 100% Modulus, psi | | | | | | | |
| Normal | | | | | | 670 | |
| Parallel | | | | | | 700 | |
| 300% Modulus, psi | | | | | | | |
| Normal | | | | | | 1370 | |
| Parallel | | | | | | 1530 | |
| Elongation at Break, % | | | | | | | |
| Normal | | | | | 30 | 590 | 80 |
| Parallel | | | | | 30 | 410 | 55 |
| Hardness (Shore A) | | | | | 97.5 | 78 | 97.0 |
| Small Strain Properties | | | | | | | |
| Tangent (Young's) Modulus, psi | | | | | | | |
| Normal | | | | | 90,900 | 4,000 | 100,000 |
| Perpendicular | | | | | 83,300 | 3,650 | 87,900 |

Illustrative Embodiment IV

In Illustrative Embodiment IV, the polymer blend numbered 144 from Illustrative Embodiment III was examined by a selective extraction technique. In this technique, the polymer blend is subjected to a 16-hour Soxhlet extraction with hot refluxing toluene. Ideally, the hot toluene should extract the block copolymer but should not dissolve the PBT. The unextracted portion of the blend is weighed after extraction and the weight loss compared with the expected values.

The selective extraction technique reveals the presence of co-continuous interlocking networks in blend 144. The toluene extracted 21.4% by weight compared to an expected 25%, well within the accuracy of the technique. This indicates that the block copolymer was continuous since apparently all of the block copolymer was accessible to the hot toluene. The PBT was continuous since no particles became dislodged in the extraction, and the unextracted portion retained its shape.

Comparative Example I

In Comparative Example I an unhydrogenated styrene-butadiene block copolymer having styrene end blocks of about 10,000 molecular weight and a total molecular weight of around 75,000 was blended with PBT according to the procedure of Illustrative Embodiment III. The blend contained about 40% block copolymer and 60% PBT. This blend, however, was successful since the block copolymer began to degrade and crosslink at the temperatures required to melt blend with the PBT.

What is claimed is:

1. A composition comprising the admixture obtained by intimately mixing about 4 to about 96 parts by weight of a block copolymer and about 96 to about 4 parts by weight of a saturated thermoplastic polyester so as to form at least partial continuous interlocking networks wherein:
   a. said block copolymer comprises at least two monoalkenyl arene polymer end blocks A and at least one substantially completely hydrogenated conjugated diene mid block B, said block copolymer having an 8 to 55 percent by weight monoalkenyl arene polymer block content, each polymer block A having an average molecular weight of between about 5,000 and about 125,000, and each polymer block B having an average molecular weight of between about 10,000 and about 300,000; and
   b. said saturated thermoplastic polyester has a generally crystalline structure, a molecular weight in excess of about 20,000, and a melting point over about 120° C and is selected from the group consisting of:
      (i) the condensation product of a dicarboxylic acid and a glycol;
      (ii) polypivalolacetone;
      (iii) polycaprolactone.

2. A composition according to claim 1 wherein said block copolymer monoalkenyl arene is styrene and said block copolymer conjugated diene is selected from isoprene and butadiene.

3. A composition according to claim 1 wherein said block copolymer has an ABA linear structure.

4. A composition according to claim 1 wherein said block copolymer has a branched structure.

5. A composition according to claim 3 wherein said block copolymer is a selectively hydrogenated block copolymer of styrene and butadiene, said butadiene having a 1,2 content of between about 35 and 55%.

6. A composition according to claim 1 wherein said thermoplastic polyester is poly(butylene terephthalate).

7. A composition according to claim 1 wherein said thermoplastic polyester is polypivalolacetone.

8. A composition according to claim 1 wherein said thermoplastic polyester is polycaprolactone.

9. A composition according to claim 1 wherein said thermoplastic polyester has the generalized formula:

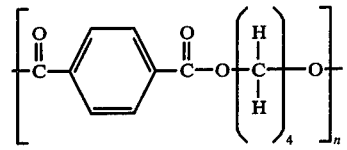

where $n$ varies from 70 to 140.

10. A composition according to claim 1 wherein said thermoplastic polyester and said block copolymer are melt blended under essentially isoviscous blending conditions.

11. A composition according to claim 10 wherein the viscosity ratio of the viscosity of the block copolymer divided by the viscosity of the thermoplastic polyester is between about 0.2 and about 4.0 at the processing temperature Tp.

12. A composition according to claim 11 wherein said viscosity ratio is between about 0.8 and about 1.2.

13. A composition according to claim 11 wherein said processing temperature Tp is between about 150° C and about 400° C.

14. A composition according to claim 1 wherein the amount of block copolymers is between about 7 and about 93 parts by weight and the amount of thermoplastic polyester is between about 93 and about 7 parts by weight.

15. A composition according to claim 1 wherein said dicarboxylic acid is terephthalic acid.

16. A composition according to claim 15 wherein said glycol is 1,4-butanediol.

17. A composition according to claim 7 wherein said polypivalolactone is a linear polymer having recurring ester structurally units mainly of the formula

18. A composition according to claim 8 wherein said polycaprolactone is a substantially linear polymer having a repeating unit

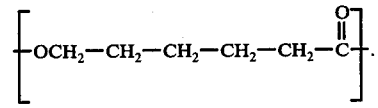

* * * * *